US008917411B2

(12) United States Patent
Miyata (10) Patent No.: US 8,917,411 B2
(45) Date of Patent: Dec. 23, 2014

(54) COMPUTER CONNECTABLE WITH A PRINTER, COMPUTER-READABLE STORAGE MEDIUM, AND PRINTING METHOD WITH DATA GENERATION TIME REDUCTION CAPABILITY

(75) Inventor: Yuji Miyata, Kitanagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1000 days.

(21) Appl. No.: 12/748,111

(22) Filed: Mar. 26, 2010

(65) Prior Publication Data

US 2010/0271660 A1  Oct. 28, 2010

(30) Foreign Application Priority Data

Apr. 22, 2009  (JP) ................. 2009-103882

(51) Int. Cl.
*G06F 3/12* (2006.01)
(52) U.S. Cl.
CPC ................... *G06F 3/1297* (2013.01)
USPC ........................ 358/1.15; 358/1.14
(58) Field of Classification Search
None
See application file for complete search history.

(56) References Cited

U.S. PATENT DOCUMENTS

| | | | | |
|---|---|---|---|---|
| 7,006,257 B1 * | 2/2006 | Yamazaki et al. | ........... | 358/1.14 |
| 2002/0054322 A1 * | 5/2002 | Geelen et al. | ................ | 358/1.15 |
| 2005/0078334 A1 * | 4/2005 | Hisatomi et al. | ............. | 358/1.15 |
| 2006/0263109 A1 * | 11/2006 | Murata | ........................... | 399/82 |
| 2007/0025745 A1 * | 2/2007 | Aoki | ............................ | 399/16 |
| 2007/0121143 A1 * | 5/2007 | Konji | .......................... | 358/1.14 |
| 2007/0195361 A1 * | 8/2007 | Tomomatsu | ................. | 358/1.15 |
| 2008/0170244 A1 * | 7/2008 | Hisatomi et al. | ............... | 358/1.2 |
| 2008/0219685 A1 * | 9/2008 | Muratani | ....................... | 399/45 |
| 2008/0231888 A1 * | 9/2008 | Kuwano | ...................... | 358/1.15 |
| 2008/0315513 A1 * | 12/2008 | Iizuka | ............................ | 399/45 |
| 2009/0002762 A1 * | 1/2009 | Sakamoto et al. | ............ | 358/1.16 |
| 2009/0283958 A1 * | 11/2009 | Takahashi | ....................... | 271/12 |
| 2010/0046048 A1 * | 2/2010 | Uotani et al. | ................. | 358/527 |
| 2012/0147399 A1 * | 6/2012 | Uotani et al. | .................. | 358/1.9 |

FOREIGN PATENT DOCUMENTS

| | | | |
|---|---|---|---|
| JP | 2003-150339 A | 5/2003 | |
| JP | 2004-216693 A | 8/2004 | |

* cited by examiner

*Primary Examiner* — Nicholas Pachol
(74) *Attorney, Agent, or Firm* — Scully, Scott, Murphy & Presser, P.C.

(57) ABSTRACT

A computer connectable with a printer includes an application unit that outputs first data, an interface that generates second data based on the first data, and a driver unit. The driver unit includes a generating unit, a determining unit, and a reducing unit. The generating unit generates third data based on the second data. The printer prints an image corresponding to the third data. The determining unit determines whether or not the image corresponding to the third data should be printed by the printer. The reducing unit reduces at least one of a first time period required to generate the second data and a second time period required to generate the third data, if the determining unit determines that the image corresponding to the third data should not be printed by the printer.

18 Claims, 8 Drawing Sheets

PAGE 1   PAGE 2   PAGE 3   PAGE 4   PAGE 5

FIG.7(B)

| PRINT START COMMAND |
| SETTING CHANGE COMMAND |
| PAGE START COMMAND |
| DRAWING COMMAND |
| ⋮ |
| DRAWING COMMAND |
| PAGE END COMMAND |
| PAGE START COMMAND |
| DRAWING COMMAND |
| ⋮ |
| DRAWING COMMAND |
| PAGE END COMMAND |
| PAGE START COMMAND |
| DRAWING COMMAND |
| ⋮ |
| DRAWING COMMAND |
| PAGE END COMMAND |
| SETTING CHANGE COMMAND |
| PAGE START COMMAND |
| DRAWING COMMAND |
| ⋮ |
| DRAWING COMMAND |
| PAGE END COMMAND |
| PAGE START COMMAND |
| DRAWING COMMAND |
| ⋮ |
| DRAWING COMMAND |
| PAGE END COMMAND |
| PRINT END COMMAND |

- PAGE 1
- PAGE 2
- PAGE 3
- PAGE 4
- PAGE 5

FIG.8(A)

| ITEM | PAGE 1-3 | PAGE 4-5 |
|---|---|---|
| SIZE | A4 | A4 |
| ORIENTATION | VERTICAL | HORIZONTAL |
| RESOLUTION | 600DPI | 600DPI |
| WATERMARK | ON | ON |

FIG.8(B)

| ITEM | PAGE 1-2 | PAGE 3 | PAGE 4-5 |
|---|---|---|---|
| SIZE | A4 | A4 | A4 |
| ORIENTATION | VERTICAL | VERTICAL | HORIZONTAL |
| RESOLUTION | 600DPI | 600DPI | 300DPI |
| WATERMARK | ON | OFF | OFF |

FIG.8(C)

| |
|---|
| PRINT START COMMAND |
| PRINT DATA FOR PAGE 1 |
| PRINT DATA FOR PAGE 2 |
| PRINT END COMMAND |

COMPUTER CONNECTABLE WITH A PRINTER, COMPUTER-READABLE STORAGE MEDIUM, AND PRINTING METHOD WITH DATA GENERATION TIME REDUCTION CAPABILITY

CROSS REFERENCE TO RELATED APPLICATION

This application claims priority from Japanese Patent Application No. 2009-103882 filed Apr. 22, 2009. The entire content of this application is incorporated herein by reference.

TECHNICAL FIELD

The present invention relates to a computer having a printer driver for controlling printing operations.

BACKGROUND

In one conventional printing system including a computer having a printer driver installed thereon, the printer driver determines whether the text is too small for the printing resolution (i.e., if there is a chance the text will appear damaged) and cancels the printing job if the text is too small. In this case, the printer driver is first to recognize that the printing job has been canceled and transfers a cancel instruction to an operating system (OS) or the application.

In addition to the above example, the printer driver may cancel printing jobs in this way upon determining that a maximum allowed number of sheets has been printed. This configuration may be used on printers that regulate the number of sheets each user can print within a prescribed time period, for example.

Alternatively, a user interface (UI) of the printer driver itself may have a window for displaying a print preview. The printer driver cancels a printing job when the user performs an operation to cancel printing after viewing the print preview.

SUMMARY

However, when a printing job is canceled based on a determination by the printer driver and the printer driver transmits an instruction to the application to cancel the printing job, the application does not always behave as expected.

As one example, when the printer driver transmits an instruction to the application to cancel a printing job, in some cases the application displays a message indicating that a fatal error has occurred or behaves in some other way that causes undo anxiety for the user.

In other instances, the application issues a command to the printer driver to reprint the canceled printing job. In such a case, the printer driver might repeatedly transmit instructions to cancel the printing job while the application repeatedly issues commands to reprint the job, potentially resulting in an endless loop whereby the printing job is never canceled.

One method to prevent the application from outputting an error message or from issuing a reprint command to the printer driver is to configure the printer driver not to transmit data to the application indicating that a printing job has been canceled. In this case, the application continues to issue print-related commands, just as in a normal printing process, without recognizing that the printing job has been canceled on the printer driver end. Thus, the printer driver simply accepts commands from the application without outputting the print data corresponding to the commands, thereby achieving the objective of canceling the printing job while avoiding the application outputting an error message or issuing a reprint command.

However, when employing the method described above, the application transmits all print-related commands from the first command to the last command to the printer driver. Since this requires a commensurate amount of time to transmit all commands, the time required to cancel the printing job may be considerably long.

In view of the foregoing, it is an object of the present invention to provide a computer equipped with a printer driver capable of canceling a printing operation without transmitting data indicating that the printing job has been canceled to the application, and capable of reducing the time required to cancel the printing job.

In order to attain the above and other objects, the invention provides a computer connectable with a printer. The computer includes an application unit that outputs first data, an interface that generates second data based on the first data, and a driver unit. The driver unit includes a generating unit, a determining unit, and a reducing unit. The generating unit generates third data based on the second data. The printer prints an image corresponding to the third data. The determining unit determines whether or not the image corresponding to the third data should be printed by the printer. The reducing unit reduces at least one of a first time period required to generate the second data and a second time period required to generate the third data, if the determining unit determines that the image corresponding to the third data should not be printed by the printer.

Another aspect of the present invention provides a computer-readable storage medium storing a set of program instructions executable on a computer connectable with a printer. The computer includes an application unit that outputs first data, and an interface that generates second data based on the first data. The program instructions includes generating third data based on the second data, the printer printing an image corresponding to the third data, determining whether or not the image corresponding to the third data should be printed by the printer, and reducing at least one of a first time period required to generate the second data and the a second time period required to generate the third data, if it is determined that the image corresponding to the third data should not be printed by the printer.

Another aspect of the present invention provides a printing method executable on a computer connectable with a printer. The computer includes an application unit that outputs first data, and an interface that generates second data based on the first data. The printing method includes generating third data based on the second data, the printer printing an image corresponding to the third data, determining whether or not the image corresponding to the third data should be printed by the printer, and reducing at least one of a first time period required to generate the second data and the a second time period required to generate the third data, if it is determined that the image corresponding to the third data should not be printed by the printer.

BRIEF DESCRIPTION OF THE DRAWINGS

The particular features and advantages of the invention as well as other objects will become apparent from the following description taken in connection with the accompanying drawings, in which.

DETAILED DESCRIPTION

A preferred embodiment of the present invention will be described while referring to the accompanying drawings.

[Hardware Structure of a Printing System]

Figure 1:
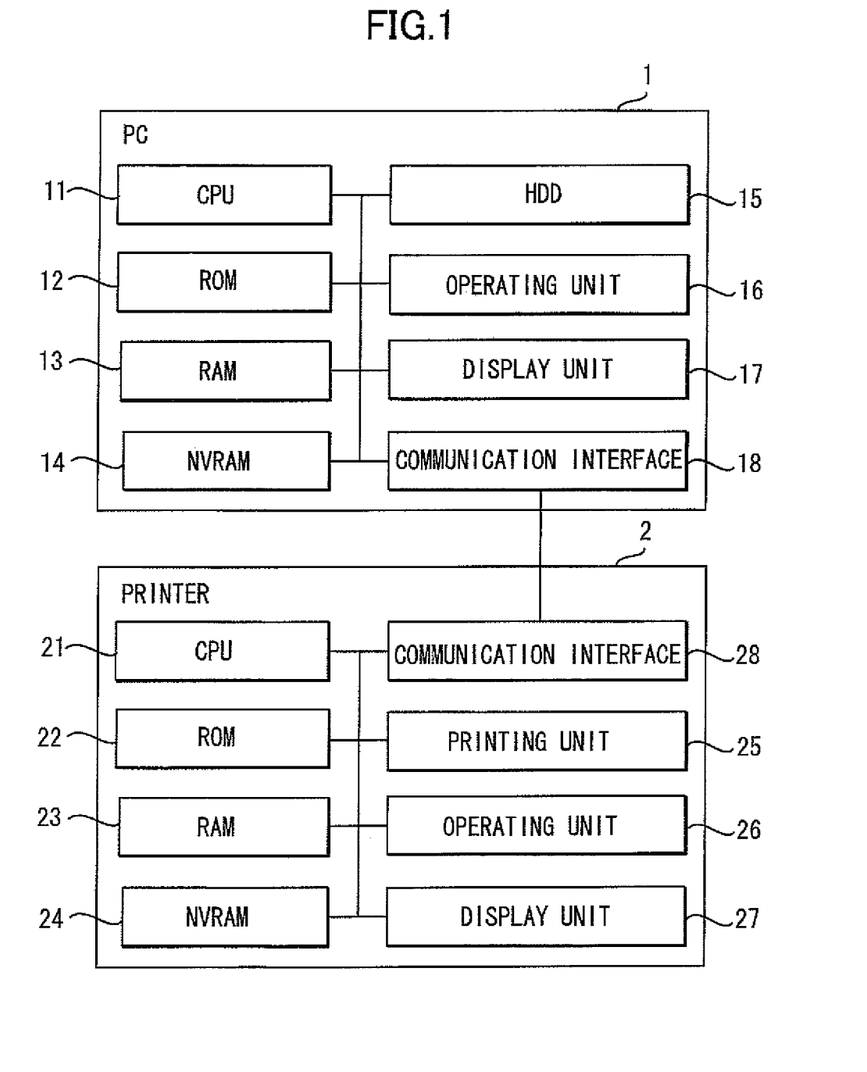
FIG. 1 is a block diagram showing an overall structure of a printing system including a PC and a printer.

As shown in FIG. 1, a personal computer (hereinafter "PC") 1 includes a CPU 11, a ROM 12, a RAM 13, a non-volatile RAM (hereinafter "NVRAM") 14, a hard disk drive (hereinafter "HDD") 15, an operating unit 16, a display unit 17, and a communication interface 18.

The CPU 11 controls each component of the PC 1 and executes various computations based on programs stored in the ROM 12 and RAM 13. Specifically, the CPU 11 executes processes for implementing an application 31, a graphics device interface (hereinafter "GDI") 33, and a printer driver 35 (see FIG. 2(a)), as well as processes for an OS.

The ROM 12 is a storage device capable of preserving stored content even after the power switch of the PC 1 is turned off. Specifically, the ROM 12 stores a basic input/output system (BIOS) and other read-only data that is not normally updated.

The RAM 13 is a storage device functioning as a main memory and the like that is directly accessed by the CPU 11. For example, the RAM 13 stores software such as the OS, the application 31, the GDI 33 and the printer driver 35 loaded from the HDD 15, results of various computations performed by the CPU 11 when executing processes, and other data read from the HDD 15. When implementing processes described later as the printer driver 35, the program for the printer driver 35 is loaded from the HDD 15 into the RAM 13, and the CPU 11 executes a process as the printer driver 35 based on this program.

The NVRAM 14 is a storage device capable of preserving stored content even when the power switch of the PC 1 is turned off and allowing updates to the stored content. The user stores data for settings changed as desired and other variable data in the NVRAM 14.

The HDD 15 is a storage device for preserving various application programs (the application 31, the GDI 33 and the printer driver 35) and data files.

The operating unit 16 is an input device by which the user can input various instructions. The operating unit 16 is configured of a keyboard and various pointing devices (such as a mouse), for example. The display unit 17 is an output device for presenting various information to the user. The display unit 17 is configured of a liquid crystal display (LCD), for example.

The communication interface 18 may be a serial interface, such as a USB interface, that connects the PC 1 to a printer and other peripheral equipment, or a local area network (LAN) interface, for example.

The printer 2 includes a CPU 21, a ROM 22, a RAM 23, an NVRAM 24, a printing unit 25, an operating unit 26, a display unit 27, and a communication interface 28.

The CPU 21 controls each component of the ROM 22 and executes various computations according to a control programs stored in the ROM 22. The ROM 22 is a storage device capable of preserving stored content after the power switch of the printer 2 is turned off. The printer 2 stores the control program used by the CPU 21, as well as various read-only data that is not normally updated.

The RAM 23 is a storage device used as a main memory or the like that can be directly accessed by the CPU 21, and as a buffer for storing data received from the PC 1. The RAM 23 also temporarily stores various data resulting from computations when the CPU 21 is executing processes.

The NVRAM 24 is a storage device that stores settings related to the printer 2 and other data that is preferably not lost when the power supply is interrupted. The printer 2 of the preferred embodiment has a function for setting a limit to the number of sheets that each user can print per month. The numbers of remaining sheets that each user can print during the current month (hereinafter referred to as "the number of remaining sheets") are stored in the NVRAM 24.

The printing unit 25 is an inkjet or electrophotographic printing mechanism capable of printing images on a sheet-like medium, such as paper. The operating unit 26 is a key input device that the user can operate when manually issuing instructions to the printer 2.

The display unit 27 is configured of an LCD and functions to display information related to the settings or status of the printer 2, for example. The communication interface 28 conforms to the same standard as the communication interface 18 on the PC 1 end and is capable of performing data communications with the PC 1.

[Software Configuration in the PC]

Next, the configuration of software installed on the PC 1 will be described.

In the preferred embodiment, an OS such as Windows XP (registered trademark) having a multitasking function is installed on the PC 1. The multitasking function enables the PC 1 to execute a plurality of tasks in parallel in order to implement various processes simultaneously.

Figure 2A:
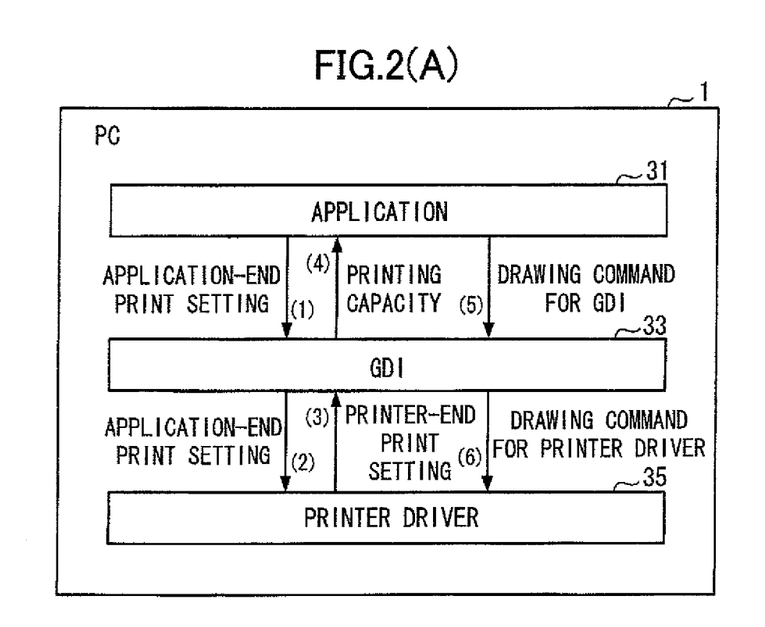
FIG. 2(a) is a block diagram showing software installed on the PC for implementing printing-related processes.

As shown in FIG. 2(a), the application 31, GDI 33, and printer driver 35 function as software for implementing printing-related processes described later.

Some representative examples of the application 31 are a word processing program and a spreadsheet program. When the user performs an operation to print a document created by the application 31, the application 31 generates printing-related commands (commands and application-end print settings described later) corresponding to the document that the user wishes to print, and issues this printing-related commands to the GDI 33.

The GDI 33 is a program for executing a drawing-related process as part of the OS. The GDI 33 executes processes to manage the device context, which is a virtual drawing region, and to create data for displaying or printing while writing to the device context.

The printer driver 35 is a program for generating and outputting the print data in response to a command transferred from the application 31 via the GDI 33. The application 31 transmits a printing-related command to the printer driver 35 via the GDI 33 by calling a function (application program interface, or API) for issuing a command to the GDI 33. Further, the GDI 33 generates and outputs print data using the printer driver 35 by calling a function (device driver interface, or DDI) for using the printer driver 35.

Figure 2B:
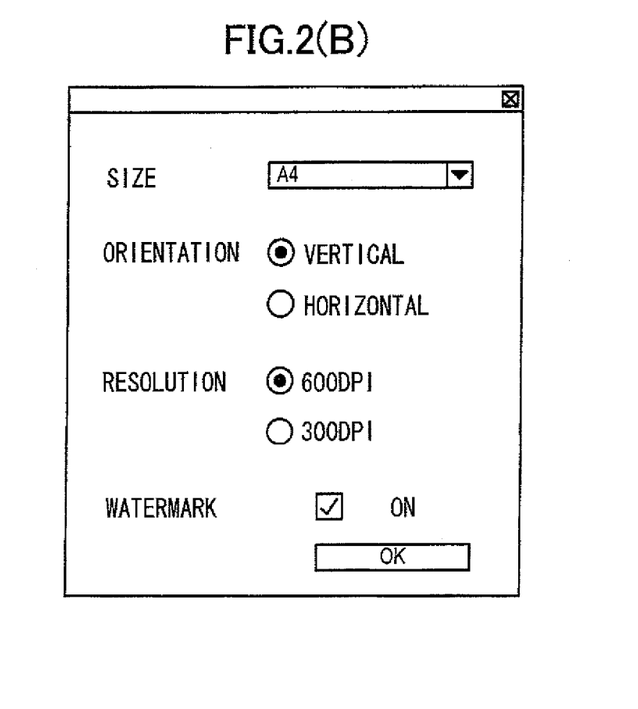
FIG. 2(b) is an example of print settings displayed by an application.

The application 31 described above has a UI for print settings, as shown in FIG. 2(b), and transfers data for print settings set by the user through this UI (application-end print settings) to the printer driver 35 via the GDI 33 ((1) and (2) in FIG. 2(a)). With the example of the print settings UI shown in FIG. 2(b), the user can set desired values for such print settings as paper size, orientation, resolution, and watermarks (an option for adding characters or symbols, such as "FOR INTERNAL USE ONLY") to the printed document. The application 31 allows the user to change the orientation of pages midway through a document having a plurality of pages and set watermarks for individual pages.

When receiving the application-end print settings, the printer driver 35 sets printer-end print settings in accordance with the application-end print settings, and transmits the printer-end print settings to the application 31 via the GDI 33 ((3) and (4) in FIG. 2(a)). If the printer driver 35 can execute a printing operation in accordance with the application-end settings, the printer-end print settings transmitted from the printer driver 35 are same as the application-end print settings. However, if the printer driver 35 cannot execute a printing operation in accordance with the application-end print settings, the printer-end print settings transmitted from the printer driver 35 are default settings different from the application-end print settings. For example, if the printer 2 is a monochrome printer though the application-end print settings request a color-print, the printer driver 35 transmits printer-end print settings corresponding to a monochrome-print to the GDI 33.

When receiving the printer-end print settings, the application 31 transmits a GDI drawing command to the GDI 33 ((5) in FIG. 2(a)). When receiving the GDI drawing command, the GDI 33 converts the GDI drawing command to a driver drawing command and transmits the driver drawing commands to the printer driver 35 ((6) in FIG. 2(a)). The printer 2 executes a printing operation in accordance with the driver drawing command.

Here, the GDI 33 converts the GDI drawing command to the driver drawing command so that the printer 2 can execute the printing operation. Therefore, the application 31 can issue the GDI drawing command without particular regard for the printer-end print settings. For example, the application 31 can issue a GDI drawing corresponding to a color-print even when the printer 2 is a monochrome printer. In this case, the GDI 33 can convert the GDI drawing command for color printing to a driver drawing command for monochrome printing.

Further, the application 31 can issue a GDI drawing command without accounting for the resolution of the printer 2. If the application 31 were to issue a GDI drawing command to the GDI 33 without specifying a resolution, the GDI 33 can determine a suitable resolution by considering the printing capacity and convert the GDI drawing command on this resolution.

Hence, the GDI 33 can absorb the difference between the application-end print settings and the printer-end print settings to avoid an undue load being applied to the application 31 and printer driver 35.

[Printing Process Performed with the Printer Driver]

Next, a printing process executed by the printer driver 35 of the PC 1 (strictly speaking, the CPU 11 executes a process on the PC 1 corresponding to the printer driver) will be described with reference to the flowcharts in FIGS. 3 through 5.

In the preferred embodiment, the number of pages that the printer 2 can print in a prescribed time period is preset. The printer 2 manages the number of pages that the printer 2 itself can print (hereinafter referred to as the "number of remaining sheets"). The printer driver 35 acquires this number of remaining sheets regulated by the printer 2 and determines whether the number of pages to be printed in the current printing job exceeds the number of remaining sheets. When the number of pages to be printed exceeds the number of remaining sheets allowed by the printer 2, the printer driver 35 cancels the print job.

Figure 8A:
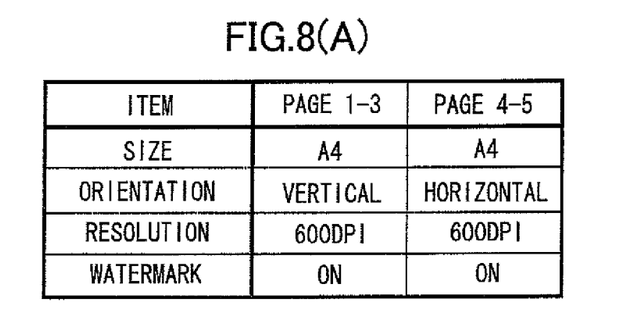
FIG. 8(a) is an example of the print settings set by a user.
Figure 8B:
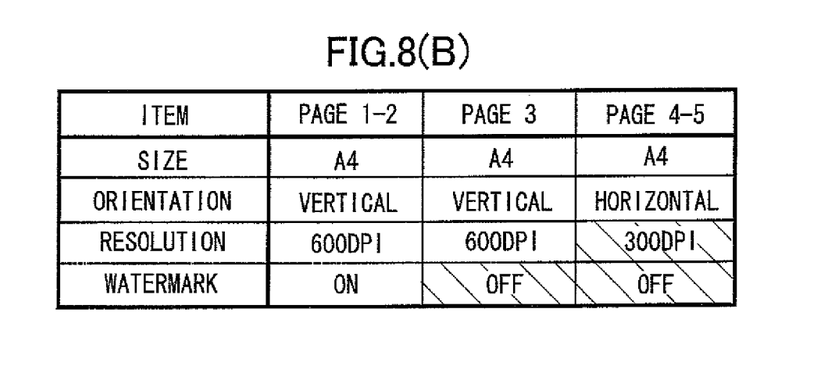
FIG. 8(b) is an example of the print settings changed by the printer driver when the printing is cancelled.

Further, in the preferred embodiment, a print start command, a setting change command, a page start command, a drawing command, a page end command, and a print end command are sequentially transmitted from the GDI 33 (application 31) to the printer driver 35 (FIG. 8(b)). The application 31 issues the next command when the printer driver 35 completes the process corresponding to each command.

The printing process begins when the application 31 calls the printer driver 35 through the GDI 33 using a print request. In S105 at the beginning of the printing process, the printer driver 35 performs an initialization process. The details of the initialization process in S105 are shown in FIG. 4.

Figure 4:
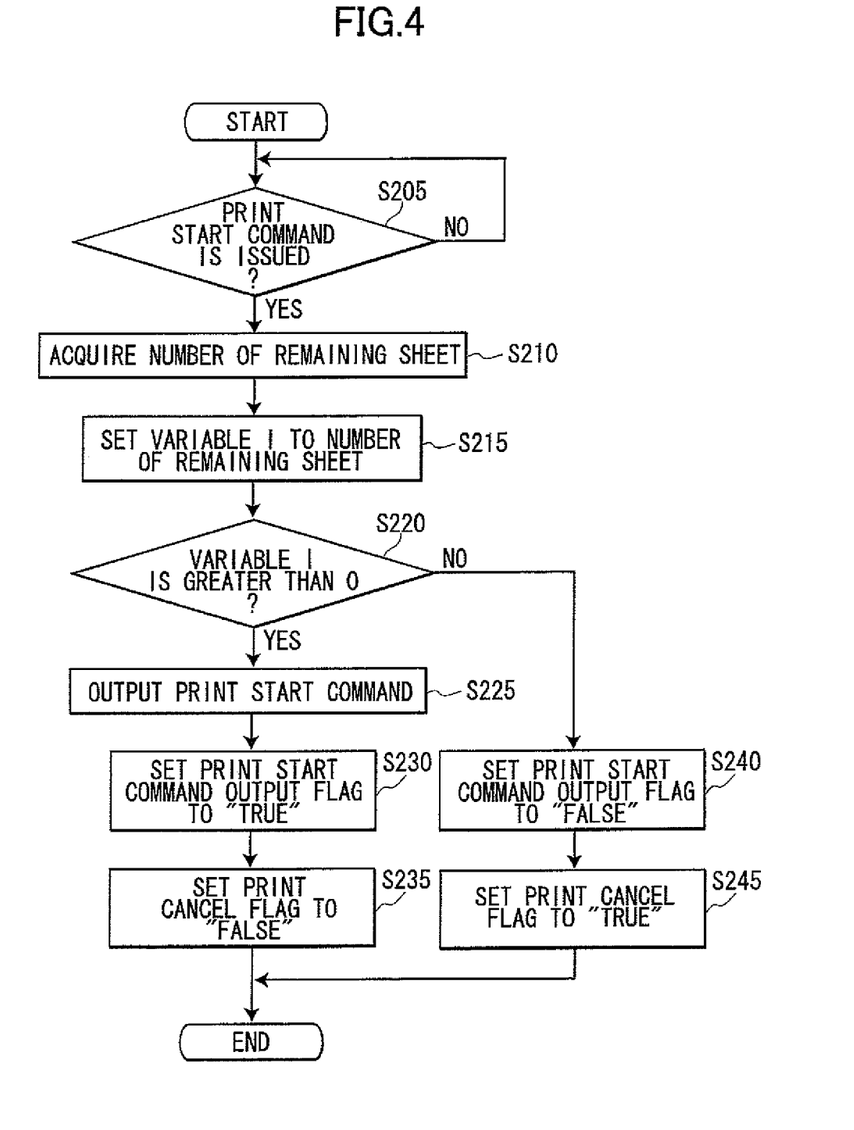
FIG. 4 is a flowchart of an initialization process.

Specifically, in S205 at the beginning of the initialization process shown in FIG. 4, the printer driver 35 determines whether a print start command was issued from the application 31. This print start command is the first command that the application 31 transfers when initiating a printing operation for a complete document.

If a print start command was not issued (S205: NO), the printer driver 35 returns to S205 and remains in a standby state until a print start command is issued (i.e., until called with a print start command). When the print start command is issued (S205: YES), in S210 the printer driver 35 acquires the number of remaining sheets stored in the NVRAM 24 from the printer 2 and in S215 sets a variable i to the acquired number.

In S220 the printer driver 35 determines whether the variable i is greater than 0. If the variable i is greater than 0 (S220: YES), in S225 the printer driver 35 outputs a print start command to the printer 2.

After outputting a print start command, in S230 the printer driver 35 sets a print start command output flag to "True," in S235 sets a print cancel flag to "False," and subsequently ends the initialization process of FIG. 4. Here, the print start command output flag is set to "True" when a print start command has been outputted, while the print cancel flag is set to "True" when the printing operation has been canceled by the printer driver 35.

However, if the variable i is less than or equal to 0 in S220 (S220: NO), indicating that there are no more sheets available for printing, the printer 2 can no longer print any more sheets from this point. Accordingly, in S240 the printer driver 35 sets the print start command output flag to "False" and in S245 sets the print cancel flag to "True," without outputting any data to the printer 2, including the print start command described above. Subsequently, the printer driver 35 ends the initialization process of FIG. 4.

After completing the initialization process of FIG. 4 described above (and hence completing S105 of FIG. 3), in S110 the printer driver 35 determines whether a setting change command has been issued from the application 31. The setting change command is a command transferred from the application 31 at the beginning of a printing operation for each page of a document when the print settings change from page to page, and includes the application-end print settings transmitted from the application 31 via the GDI 33.

If a setting change command is received in S110 (S110: YES, (1) and (2) in FIG. 2(a)), in S115 the printer driver 35 sets printer-end print settings in accordance with the application-end print settings transmitted from the application 31, as shown in FIG. 2(b). In the preferred embodiment, it is assumed that the printer driver 35 can execute a printing operation in accordance with the application-end settings. Therefore, the printer-end print settings set in 115 are same as the application-end print settings.

In S120 the printer driver 35 determines whether the print cancel flag is set to "True." If the print cancel flag is "True" (S120: YES), in S125 the printer driver 35 changes setting items that affects processing on the GDI 33 among the printer-end printing settings set in S115 in order to increase processing speed and transmits the changed setting items ((3) in FIG. 2(a)), and returns to S110.

For example, paper size, orientation, resolution, and watermarks are setting items contained in the printer-end printing settings, and some of them are transmitted to the GDI 33. The items transmitted to the GDI 33 include some that effect processing speed on the GDI 33. For example, resolution is one of the setting items transferred to the GDI 33 that affects the processing speed on the GDI 33.

Specifically, when receiving a GDI drawing command from the application 31 ((5) in FIG. 2(a)), the GDI 33 converts the GDI drawing command to a driver drawing command ((6) in FIG. 2(a)). In this time, when the setting item transmitted from the printer driver 35 is for a high resolution, the GDI 33 converts the GDI drawing command received from the application 31 to a more detailed driver drawing command, for example. On the other hand, when the setting item is for a low resolution, the GDI 33 converts the GDI drawing command to a more brief driver drawing command.

Consequently, the process time on the GDI 33 is longer when the resolution is higher. However, the printing operation is no more executed when the print cancel flag is set to "True" indicating that the printer driver 35 has determined to cancel the printing operation. Therefore, it is preferable to speed up the process on the GDI 33 when the printing operation is no more executed.

Hence, in S125 the printer driver 35 performs a process to change the value of settings that can contribute to speed up the internal process of the GDI 33 (resolution in the above example), and transmits the changed setting value to the GDI 33. For example, if the user originally set the resolution to 600 dpi, in S125 the printer driver 35 changes the resolution to 300 dpi in order to speed up processing on the GDI 33.

Here, the degree to which the resolution is lowered may be preset based on the degree to which processing speed should be increased, and the example of 300 dpi given above is not intended to be a recommended value. Further, while resolution is reduced in the above example, if the process speed on the GDI 33 can be improved by changing print settings other than resolution, all of these settings may be targeted for change in S125.

However, if the printer driver 35 determines in S120 that the print cancel flag is set to "False" (S120: NO), indicating that the printer driver 35 has not determined to cancel the printing operation, the printer driver 35 skips S125, transmits the printer-end settings set in S115 and returns to S110.

If the printer driver 35 determines in S110 that a setting change command was not issued (S110: NO), in S130 the printer driver 35 determines whether a page start command was issued from the application 31. The page start command is a command transferred from the application 31 for initiating the printing of one page in the document prior to a GDI drawing command.

If a page start command was issued (S130: YES), in S135 the printer driver 35 executes a page process. This page process of S135 will be described here in greater detail with reference to FIG. 5.

Figure 5:
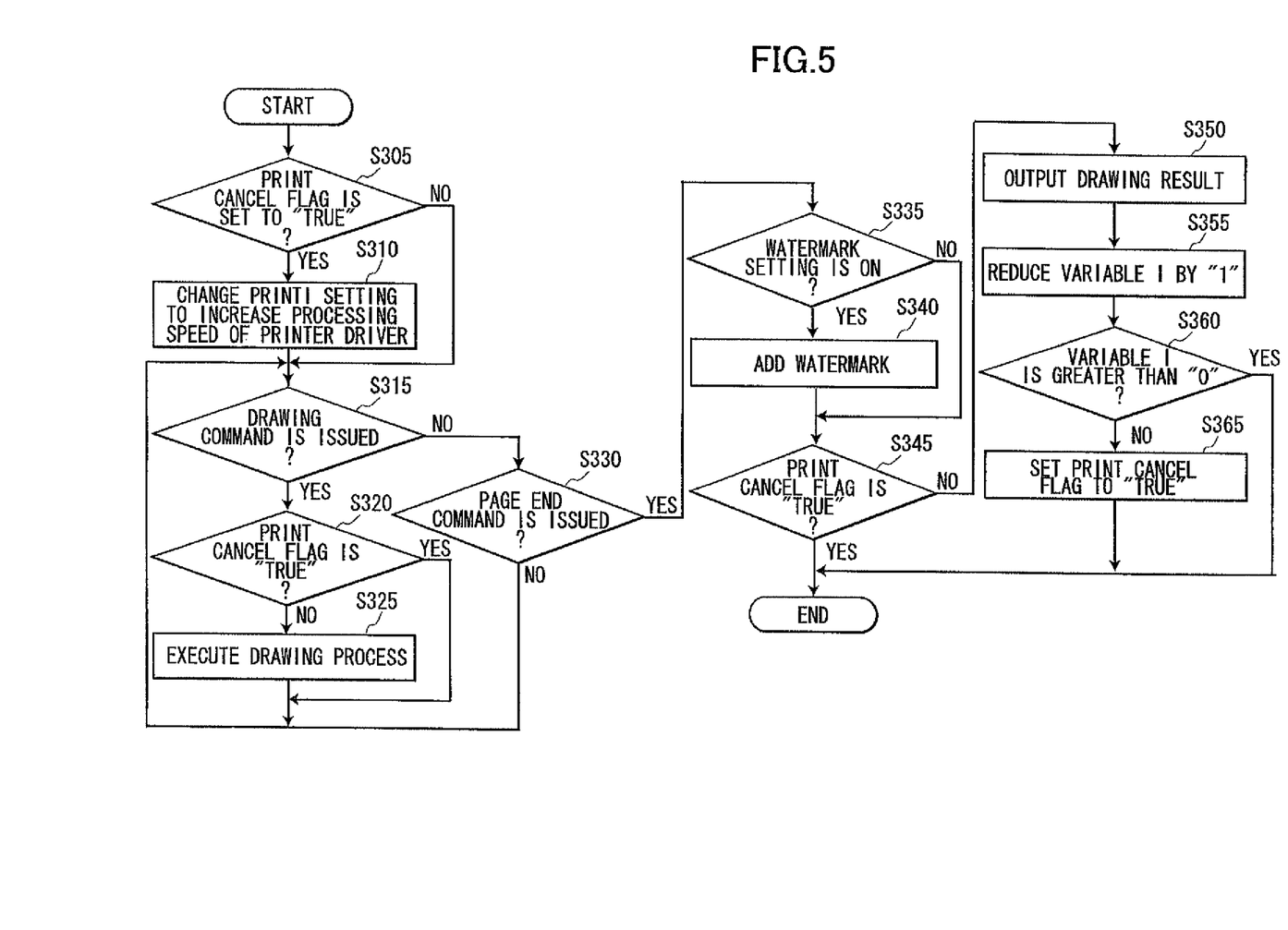
FIG. 5 is a flowchart of a page process.

In S305 at the beginning of the page process shown in FIG. 5, the printer driver 35 determines whether the print cancel flag is set to "True." If the print cancel flag is "True" (S305: YES), in S310 the printer driver 35 changes setting items that affects processing on the printer driver 35 among the printer-end print settings set in S115 or S125 in order to increase processing speed, and subsequently advances to S315.

For example, a watermark is added through an internal process of the printer driver 35. Therefore, the printer driver 35 requires more time to completely processing when a watermark has been set. Thus, the time required for processing by the printer driver 35 can be reduced when a watermark is not set. Thus, even if the user had originally set the watermark setting to ON in the print settings, in S310 the printer driver 35 changes the print settings to turn the watermark setting to OFF in order to speed up processing on the printer driver 35.

In the above example, the watermark setting is changed. However, if there are other print settings beside the watermark setting that can be changed to increase the processing speed of the printer driver 35, these settings are all targeted for change in S310.

On the other hand, if the printer driver 35 determines in S305 that the print cancel flag is set to "False" (S305: NO), indicating that the printer driver 35 has not determined to cancel the printing operation, the printer driver 35 skips S310 and advances directly to S315.

In S315 the printer driver 35 determines whether a drawing command has been issued from the application 31 via the GDI 33. The drawing command is a command transferred from the application 31 in order to draw text, graphics, and the like within each page of a document.

If a drawing command has been issued (S315: YES, (6) in FIG. 2(a)), in S320 the printer driver 35 determines whether the print cancel flag is "True." If the print cancel flag is "False" (S320: NO), indicating that the printer driver 35 has not determined to cancel the printing operation, in S325 the printer driver 35 executes a drawing process corresponding to the (driver) drawing command, and subsequently returns to S315. The printer driver 35 repeats the process in S315-S325 in this way while drawing commands are transferred from the application 31 to perform all drawing within one page.

However, when the printer driver 35 determines in S320 that the print cancel flag is "True" (S320: YES), indicating that the printer driver 35 has determined to cancel the print job, the printer driver 35 returns to S315 without executing S325. In this case, the printer driver 35 repeats S315-S320 while drawing commands are transferred from the application 31, but does not actually perform drawing processes since S325 is skipped.

When the printer driver 35 determines in S315 that a drawing command has not been issued (S315: NO), in S330 the printer driver 35 determines whether a page end command has been issued from the application 31. The page end command is a command transferred from the application 31 to end the printing operation for each page of the document.

If a page end command has not been issued (S330: NO), the printer driver 35 returns to S315 and waits until another command is received. However, when a page end command has been issued (S330: YES), in S335 the printer driver 35 determines whether the watermark setting is ON.

If the watermark setting is ON (S335: YES), in S340 the printer driver 35 performs a process to add a watermark to the print data for the current page and subsequently advances to S345. However, if the watermark setting is OFF (S335: NO), the printer driver 35 advances to S345 without executing S340.

When the printer driver 35 executes S340, a processing time equivalent to the process for adding a watermark is added to the processing load of the printer driver 35. However, even if the user originally set the watermark setting to ON, the printer driver 35 may change the watermark setting to OFF when executing S310. In this case, the printer driver 35 does not execute the process in S340, thereby reducing the amount of processing time required by the printer driver 35.

In S345 the printer driver 35 determines whether the print cancel flag is "True." If the print cancel flag is "False" (S345: NO), indicating that the printer driver 35 has determined to cancel the printing operation, in S350 the printer driver 35 outputs the drawing results to the printer 2.

The process in S350 is a color conversion process performed by normal printer drivers to convert the image drawn in the drawing region to color image data formed of prescribed color components (CMYK components, for example). Next, the printer driver 35 performs a binarization process in S350 to generate binary color image data based on the converted color image data, and subsequently compresses the data for each color plane to a prescribed resolution.

In addition, the printer driver 35 adds various control commands to the compressed data, generates a page description language (PDL) supported by the printer 2, and transmits one page worth of this PDL data to the printer 2. More specifically, the printer driver 35 outputs the page worth PDL data to a spooler, and the spooler performs subsequent processes to output the PDL data to the printer 2.

After outputting the drawing results to the printer 2 in this way, in S355 the printer driver 35 reduces the variable i by "1" and in S360 determines whether the variable i is greater than "0." If the variable i is less than or equal to "0" (S360: NO), indicating that there are no more available sheets for printing, in S365 the printer driver 35 sets the print cancel flag to "True" and subsequently ends the page process of FIG. 5.

However, if the variable i is greater than "0" (S360: YES), indicating that there remain sheets for printing, the printer driver 35 skips S365 and ends the page process of FIG. 5.

If the printer driver 35 determines in S345 that the print cancel flag is "True" (S345: YES), indicating that the printer driver 35 has determined to cancel the printing operation, the printer driver 35 skips the processes in S350-S365 and ends the page process of FIG. 5.

After completing the page process of FIG. 5 described above (and consequently completing S135 of FIG. 3), the printer driver 35 returns to S110 of FIG. 3.

Further, if the printer driver 35 determines in S130 that a page start command was not issued (S130: NO), in S140 the printer driver 35 determines whether a print end command was issued from the application 31. The print end command is a command transferred from the application 31 to end the printing operation for the entire document.

If a print end command was not issued (S140: NO), the printer driver 35 returns to S110 and waits for another command to arrive. However, if a print end command was issued (S140: YES), in S145 the printer driver 35 determines whether the print start command output flag is set to "True." The print start command output flag is either set to "True" in S230 of FIG. 4 or set to "False" in S240.

Hence, if the print start command output flag is "True" at this time (S145: YES), indicating that a print start command has been outputted to the printer 2 in S225, in S150 the printer driver 35 outputs a print end command to complement the print start command, and subsequently advances to S155. On the other hand, if the print start command output flag is "False" (S145: NO), indicating that a print start command has not yet been outputted to the printer 2, the printer driver 35 skips S150 and advances directly to S155.

Figure 6:
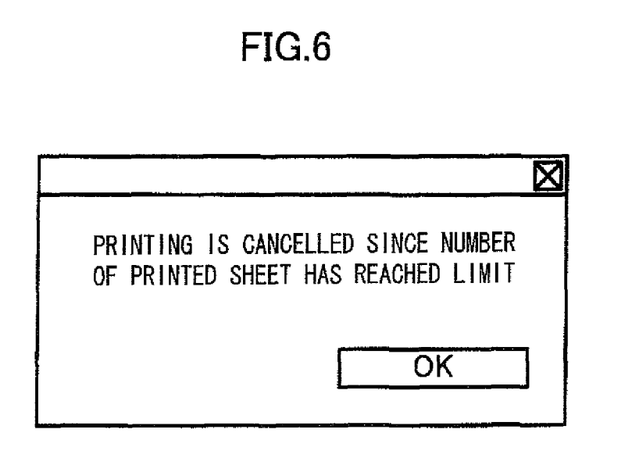
FIG. 6 is an example of a cancellation massage.

In S155 the printer driver 35 determines whether the print cancel flag is set to "True." If the print cancel flag is "True" (S155: YES), indicating that the printer driver 35 has determined to cancel the printing operation, in S160 the printer driver 35 displays a cancellation message and subsequently ends the printing process of FIG. 3. FIG. 6 shows an example of a cancellation message displayed on the display unit 17 of the PC 1 during the process of S160. From this message, the user can recognize that the printing job has been canceled.

However, if the print cancel flag is "False" in S155 (S155: NO), indicating that the printer driver 35 has not determine to cancel the printing operation, then the printer driver 35 ends the printing process in FIG. 3 without executing S160.

[Cases for Performing Print Cancel Control]

Next, a specific example will be described in which the CPU 11 functioning as the printer driver 35 performs print cancel control.

Figure 7A:
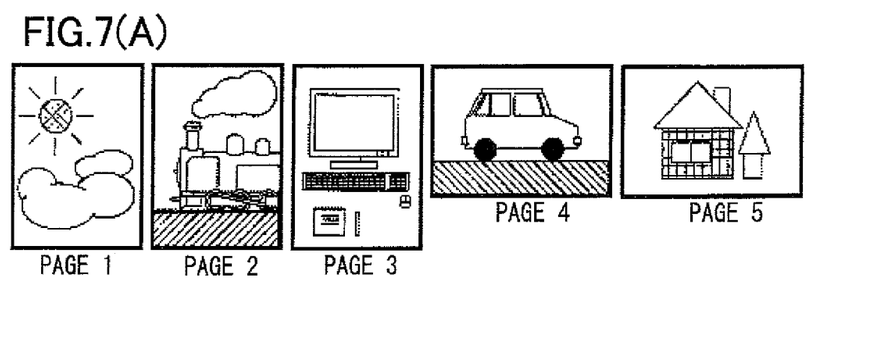
FIG. 7(a) is a specific example of documents to be printed based on commands from the application.

In the following example, it will be assumed that the user has issued a command to print the five-page document illustrated in FIG. 7(a). For this document, the orientation of pages 1-3 is vertical (portrait), while the orientation for pages 4 and 5 is horizontal (landscape). These print settings were established on the application 31 end with the user inputting settings in the print settings UI shown in the example of FIG. 2(b).

Further, in this example it will be assumed that the number of remaining sheets stored in the printer 2 is "2". Hence, although the user has issued a command to print a five-page document, in the example described below it will be assumed that the printer driver 35 will print up to page 2, since there are only two remaining sheets, but will determine that printing is impossible beginning from page 3 and will perform print cancel control.

Figure 7B:
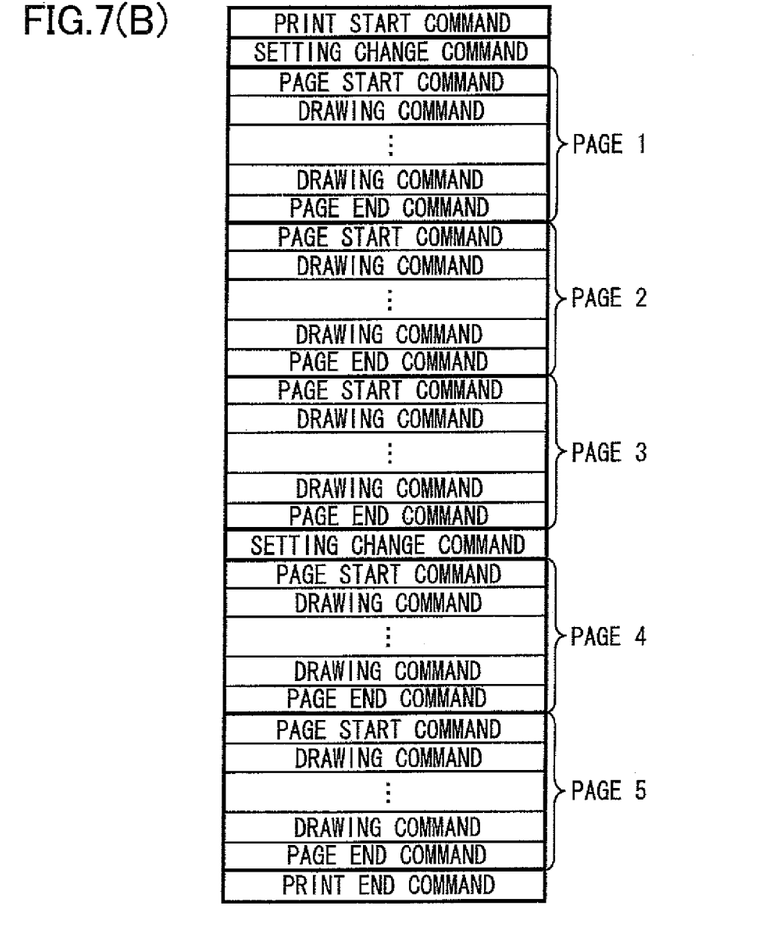
FIG. 7(b) is a specific example of the commands transmitted to a printer driver.

After the user issues a command to print the document, as described above, the application 31 transfers a print-related command (commands and application-end print settings) to the printer driver 35 via the GDI 33. The command transferred to the printer driver 35 at this time is a command set, such as that shown in FIG. 7(b).

More specifically, first the application 31 transfers a print start command to the printer driver 35 and subsequently transfers a setting change command. Further, the application 31 the application-end print settings with the setting change command set in the print setting UI shown in FIG. 2(b). In this example, the application-end print settings at this stage include an orientation setting of "vertical."

Next, the application 31 transfers a page start command, drawing commands, and a page end command to the printer driver 35 for each page. The number and types of drawing commands change according to the content of each page. In this example, after the application 31 has transferred a group of commands corresponding to pages 1 through 3, the application 31 again transfers setting change command and application-end print settings prior to transferring the set of commands corresponding to page 4 and subsequent pages. These application-end print settings include an orientation setting of "horizontal."

Thus, the application 31 can specify different print settings for pages 1 through 3 and pages 4 and 5, as shown in FIG. 8(a). After transferring the set of commands corresponding to page 5, the application 31 transfers a print end command and subsequently ends the process for transferring commands to the printer driver 35.

After the set of commands has been transferred to the printer driver 35, as described above, ordinarily the printer driver 35 would generate an output print data corresponding to the five-page document. However, since the number of remaining sheets is only "2" in the current example, the PC 1 cannot print page 3 and subsequent pages of a five-page document.

Accordingly, after the application 31 transfers the set of commands corresponding to page 3 and subsequent pages to the printer driver 35, the printer driver 35 changes the driver-end print settings in the printing process described earlier for each page as shown in FIG. 8(b) (the shaded boxes in the table indicate settings that have been changed). Further, the printer driver 35 does not generate or output print data for page 3 and subsequent pages, so that pages 3 through 5 are not printed on the printer 2.

The driver-end print settings are changed in two stages in this way so that the printer driver 35 can perform the changes at a desired timing since printing items that impact the processing speed of the printer driver 35 are changed internally, while setting items that impact the processing speed of the GDI 33 can be changed only when the setting change command is issued. Therefore, in this example, the printer driver 35 changes the printer-end print settings in two stages.

Specifically, since the remaining number of sheets reaches "0" after print data for page 2 has been outputted in this example, subsequent pages are not printed. Therefore, when processing the set of commands corresponding to page 3, the printer driver 35 determines that the print cancel flag is set to "True" in S305 of FIG. 5, and in S310 changes setting items that affect processing speed of the printer driver 35 to increase the speed as the first stage of changes. As a result, the watermark setting for page 3 and subsequent pages is changed to OFF in the present example.

Therefore, the printer driver 35 is released from the burden of drawing watermarks, even if the user original set the watermark setting to ON, in the processing stage for processing the set of commands corresponding to page 3. Hence, the printer driver 35 can complete processing more quickly without having to draw the watermark.

Further, in this example, the printer driver 35 is called with a setting change command prior to the page process for the fourth page to change the printer-end print settings (i.e., the orientation is changed from vertical to horizontal). Accordingly, in S110 the printer driver 35 determines that an setting change command has been issued, in S120 determines that the print cancel flag is set to "True," and in S125 changes print settings that impact processing speed on the GDI 33 to improve processing speed as the second stage of changes. As a result, the printer driver 35 changes the resolution for the fourth page and subsequent pages to 300 dpi in this example.

Therefore, when the printer driver 35 is processing the set of commands corresponding to page 4 and subsequent pages, the GDI 33 is transferring commands necessary for drawing at 300 dpi. Hence, the GDI 33 can complete processing more quickly than when transferring commands required to draw at 600 dpi.

As described above, the PC 1 according to the preferred embodiment can reduce both the time required for the application 31 to complete transmission of the command set and the time required for the printer driver 35 to complete processing more so than a device that does not change print settings in this way, but simply suspends the generation and output of print data.

Figure 8C:
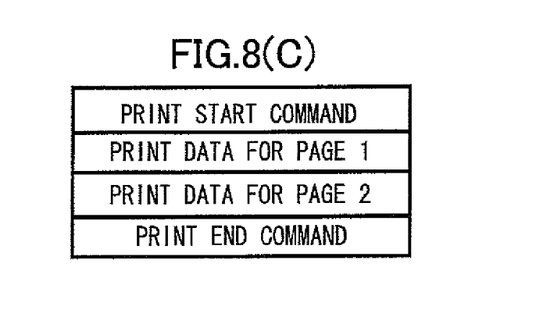
FIG. 8(c) is an example of print data outputted from the printer driver when the printing for 3-5 pages is cancelled.

Even when the PC 1 performs the print cancel control process described above, if the print start command output flag is set to "True" (S145: YES), in S150 the printer driver 35 outputs a print end command. As a result, the printer driver 35 generates two pages worth of print data and outputs this print data to the printer 2, as illustrated in FIG. 8(c).

[Effects of the Embodiment]

Figure 3:
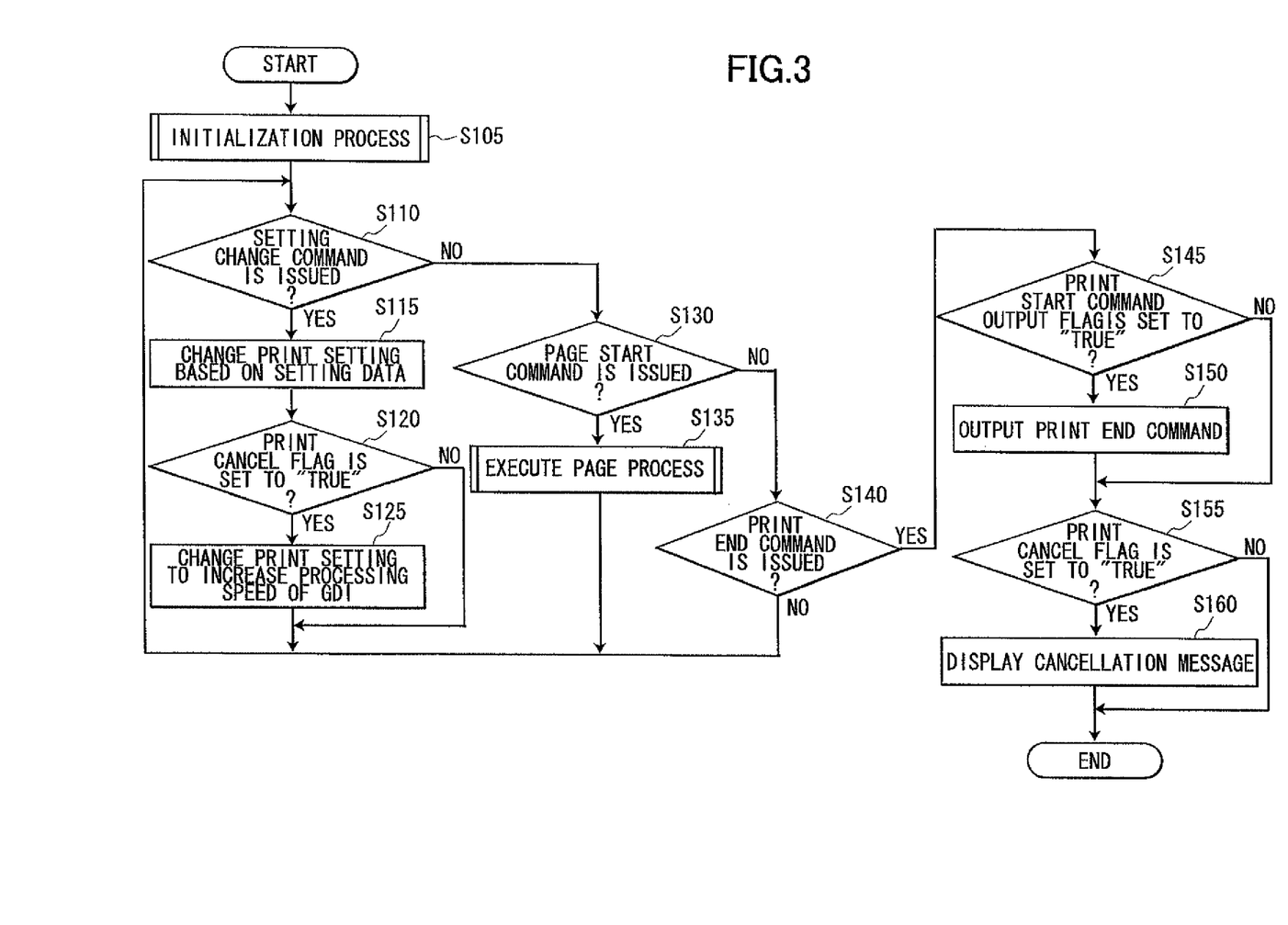
FIG. 3 is a flowchart of a printing process.

In the preferred embodiment described above, when a print cancel condition is met, in S125 of FIG. 3 the printer driver 35 changes print settings so that a pre-process performed on the GDI 33 can be completed in a shorter time (in the preferred embodiment, processing at a resolution of 600 dpi is replaced with processing for a resolution at a resolution of 300 dpi, which can be completed more quickly). Further, in S310 the printer driver 35 changes print settings so that a post-process performed on the printer driver 35 is not executed (the watermark is not drawn in the preferred embodiment).

Hence, despite not transmitting a print cancel command to the application 31 and, therefore, still receiving print related commands, the printer driver 35 can reduce the amount of processing time required for canceling the printing operation. Further, by not transferring data to the application 31 indicating that the printing operation has been canceled, the printer driver 35 can prevent the application 31 from exhibiting unexpected behavior.

The printer driver 35 performs this control by changing print settings referenced in a pre-process of the GDI 33 when the GDI 33 transfers an setting change command. Accordingly, the printer driver 35 can speed up the pre-process on the GDI 33, as described above, without requiring that a special interface be added to the GDI 33.

Further, since the printer driver 35 changes print settings so that a post-process is not executed on the printer driver 35 when the GDI 33 transfers a page start command, the printer driver 35 can reduce the time required for a post-process on the printer driver 35, even before print settings referenced in a pre-process on the GDI 33 can be changed. In this way, the printer driver 35 can contribute to shortening the time required for canceling a printing operation.

In addition, when canceling a printing operation, the printer driver 35 notifies the user in S160 that the printing operation has been canceled. Hence, by monitoring cancellation messages, the user can detect when a printing job has been canceled or has been performed normally.

[Variations of the Embodiment]

While the invention has been described in detail with reference to specific embodiments thereof, it would be apparent to those skilled in the art that many changes and variations may be made therein without departing from the spirit of the invention, the scope of which is defined by the attached claims.

For example, in the preferred embodiment described above, resolution is changed from a high value of 600 dpi to a low value of 300 dpi to enhance the processing speed on the GDI 33, but the absolute values of resolution are arbitrary, provided that the changed resolution contributes to an increased processing speed. For example, the resolution may be changed to 100 or 150 dpi, or to another value different from that described in the preferred embodiment.

Further, the print setting changed to improve processing speed on the GDI 33 may be a different setting than resolution. For example, the color mode (full color or monochrome) may be changed. Since a smaller amount of data is transferred in the monochrome mode than in the full color mode, changing the color mode to monochrome can improve processing speed on the GDI 33.

Further, while the example in the preferred embodiment for enhancing processing speed on the printer driver 35 entails skipping the process for drawing watermarks, the printer driver 35 may be configured to avoid performing processes other than drawing watermarks.

For example, processes for adding a header or footer, for performing color conversion, and for performing collating are not necessary when a printing operation has been canceled. Hence, by changing the settings so that these processes are not executed (or by executing only some of the processes to reduce the overall processing load), processing by the printer driver 35 can be completed more quickly.

In the preferred embodiment described above, the printer driver 35 changes print settings referenced during a pre-process performed on the GDI 33 when the GDI 33 transfers an setting change command. However, the printer driver 35 may also change print settings so as not to execute a post-process on the printer driver 35 at the same timing. More specifically, the printer driver 35 may execute a process equivalent to S310 together with the process in S125.

In the preferred embodiment described above, the printer driver 35 cancels a printing operation when the remaining number of sheets reaches "0". However, the present invention may be applied to a case in which the printer driver 35 cancels the printing operation based on another condition.

For example, when the printer driver 35 has a window for displaying a print preview in its own UI, the printer driver 35 may be configured to cancel a printing job when the user performs an operation to cancel the job when viewing the preview.

Alternatively, the printer driver 35 may have a fax number input window corresponding to a PC-Fax function as part of its own UI. In this case, the printer driver 35 may be configured to cancel a fax transmission when the user performs an operation in the input window to cancel the fax transmission. In other words, the printing device of the present invention includes the entire device recognized by the PC as a printing device. Thus, the concept of a printing device according to the present invention includes a standalone printer, a facsimile device, and a multifunction peripheral, for example.

Further, if the printer driver 35 has a function for detecting whether a document or the like being printed is confidential based on a specific keyword or a specific image, the printer driver 35 may be configured to cancel printing when a confidential document is being printed.

Since the printer driver 35 according to the preferred embodiment may cancel a printing operation both based on a user instruction and not based on a user instruction, a step may be added to the printing process for determining which of the two cases has occurred before displaying the cancellation message in S160. With this configuration, the printer driver 35 displays a cancellation message only when the printer driver 35 made the determination to cancel printing based not on a user instruction. Thus, the printer driver 35 can avoid outputting a cancellation message when the user explicitly gave an instruction to cancel the printing job so that the user is not forced to close a dialog box displaying the cancellation message.

What is claimed is:

1. A computer connectable with a printer, the computer comprising:
a processor; and
a storage device storing:
an application program, when executed by the processor, causing the processor to launch an application;
an interface program, when executed by the processor, causing the processor to launch an interface to perform:
outputting a print start command in response to a printing-related command received from the application in which operation to start printing is performed;
outputting a setting change command and a first print settings in accordance with the printing-related command received from the application after outputting the print start command;
issuing a drawing command after outputting the setting change command and the first print settings, the drawing command being issued in accordance with a second print settings when the first print settings is converted into the second print settings, the drawing command being issued in accordance with the first print settings when the first print settings is not converted;
outputting the drawing command;
transmitting a page end command to a printer driver in response to the printing-related command received from the application after outputting the drawing command; and
transmitting a print end command to the printer driver in response to the printing-related command received from the application after outputting the page end command; and
a printer driver program, when executed by the processor, causing the processor to launch the printer driver, after the print start command is received from the interface, to perform:
determining whether or not a print cancel condition for canceling print according to the print start command is met;
storing print cancel information in response to determination that the print cancel condition is met without reporting to the application that the print cancel condition is met; and
converting the first print settings inputted from the interface into the second print settings if the print cancel information is stored when the setting change command is received, a first time period required for the interface to issue the drawing command corresponding to the first print settings being longer than a second time period required for the interface to issue the drawing command corresponding to the second print settings;
wherein the printer driver program, when executed by the processor, causes the processor to launch the printer driver, after the first print settings is converted into the second print settings, to perform:
skipping a drawing process according to the drawing command if the print cancel information is stored when the drawing command is received from the interface;
skipping an output process of a drawing result to the printer if the print cancel information is stored when the page end command is received from the interface; and
displaying a cancellation message if the print cancel information is stored when the print end command is received from the interface unit.

2. A non-transitory computer-readable storage medium storing instructions executable on a computer connectable with a printer, the computer including a processor configured to function as:

an application unit based on an application program; and
an interface unit based on an interface program,
wherein the interface unit is configured to perform:
>inputting a print start command to a printer driver unit in response to a printing-related command received from the application unit in which operation to start printing is performed;
>inputting a setting change command and a first print settings to the printer driver unit in accordance with the printing-related command received from the application unit after inputting the print start command;
>issuing a drawing command after inputting the setting change command and the first print settings, the drawing command being issued in accordance with a second print settings when the first print settings is converted into the second print settings by the printer driver unit, the drawing command being issued in accordance with the first print settings when the first print settings is not converted;
>inputting the drawing command to the printer driver unit;
>transmitting a page end command to the printer driver unit in response to the printing-related command received from the application unit after inputting the drawing command; and
>transmitting a print end command to the printer driver unit in response to the printing-related command received from the application unit after inputting the page end command;
wherein the instructions, when executed by the computer, causes the computer to launch the printer driver unit, after the print start command is received from the interface unit, to perform:
>determining whether or not a print cancel condition for canceling print according to the print start command is met;
>storing print cancel information in response to determination that the print cancel condition is met without reporting to the application unit that the print cancel condition is met; and
>converting the first print settings inputted from the interface unit into the second print settings if the print cancel information is stored when the setting change command is received, a first time period required for the interface unit to issue the drawing command corresponding to the first print settings being longer than a second time period required for the interface unit to issue the drawing command corresponding to the second print settings;
wherein the instructions, when executed by the computer, causes the computer to launch the printer driver unit, after the first print settings is converted into the second print settings, to perform:
>skipping a drawing process according to the drawing command if the print cancel information is stored when the drawing command is received from the interface unit;
>skipping an output process of a drawing result to the printer if the print cancel information is stored when the page end command is received from the interface unit; and
>displaying a cancellation message if the print cancel information is stored when the print end command is received from the interface unit.

3. The instructions according to claim 2, further causing the computer to perform executing the drawing process according to the drawing command and the output process of the drawing result to the printer according to the drawing command if the print cancel information is not stored when the drawing command is received from the interface unit.

4. The instructions according to claim 3, wherein the converting converts the first print settings into the second print settings each time the interface unit inputs the first print settings after the determination that the print cancel condition is met,
>wherein the executing executes the drawing process according to the drawing command each time the interface unit inputs the drawing command after the determination that the print cancel condition is not met,
>wherein the skipping drawing process skips the drawing process according to the drawing command when the interface unit inputs the drawing command after the first print settings is converted into the second print settings in response to the determination that the print cancel condition is met, and
>wherein the executing executes the output process of the drawing result to the printer in response to information indicating drawing completion inputted from the interface unit after the drawing process is executed.

5. The instructions according to claim 4, further causing the computer to perform:
>changing a first post-process settings included in the first print settings inputted from the interface unit into a second post-process settings that allows the printer driver to skip a post-process of the drawing result;
>executing the post-process of the drawing result according to the first post-process settings in response to the information indicating drawing completion inputted from the interface unit, after the determination that the print cancel condition is not met and execution of the drawing process; and
>skipping the post-process of the drawing result, when the interface unit inputs the information indicating drawing completion after the first post-process settings is changed into the second post-process settings in response to the determination that the print cancel condition is met,
>wherein the executing output process executes the output process of the post-processed drawing result in response to the execution of the post-process of the drawing result, after the determination that the print cancel condition is not met, execution of the drawing process, and input of the information indicating drawing completion from the interface unit.

6. The instructions according to claim 5, wherein the changing changes the first post-process settings to add additional data to the drawing result into the second post-process settings not to add the additional data to the drawing result in response to the determination that the print cancel condition is met.

7. The instructions according to claim 6, wherein the changing changes the first post-process settings to add watermark data to the drawing result into the second data not to add the watermark data to the drawing result in response to the determination that the print cancel condition is met.

8. The instructions according to claim 6, wherein the changing changes the first post-process settings to add header/footer data to the drawing result into the second post-process settings not to add the header/footer data to the drawing result in response to the determination that the print cancel condition is met.

9. The instructions according to claim 5, wherein the changing changes the first post-process settings to perform color conversion on the drawing result into the second post-process settings not to perform the color conversion on the drawing result in response to the determination that the print cancel condition is met.

10. The instructions according to claim 5, wherein the changing changes the first post-process settings to perform collating on the drawing result into the second post-process settings not to perform the collating on the drawing result in response to the determination that the print cancel condition is met.

11. The instructions according to claim 2, wherein the determining determines that the print cancel condition is met in response to acquirement of information indicating that a maximum allowed number of sheets has been printed after the interface unit inputs the print start command.

12. The instructions according to claim 2, wherein the determining determines that the print cancel condition is met in response to acquirement of information indicating that printing on the printer is impossible from the printer after the interface unit inputs the print start command.

13. The instructions according to claim 2, further causing the computer to perform displaying a print preview in response to the print start command inputted from the interface unit,
wherein the determining determines that the print cancel condition is met in response to a print cancel operation performed by a user after the print preview is displayed.

14. The instructions according to claim 2, further causing the computer to perform displaying a fax number input window in response to the print start command inputted from the interface unit,
wherein the determining determines that the print cancel condition is met in response to a fax transmission cancel operation performed by a user after the fax number input window is displayed.

15. The instructions according to claim 2, wherein the determining determines that the print cancel condition is met in response to detection that a confidential document is being printed after the interface unit inputs the print start command.

16. The instructions according to claim 2, wherein the converting converts the first print settings indicating a first printing resolution into the second print settings indicating a second printing resolution lower than the first printing resolution in response to the determination that the print cancel condition is met.

17. The instructions according to claim 2, wherein the converting converts the first print settings indicating a first number of color into the second print settings indicating a second number of color smaller than the first number of color.

18. A printing method executable on a computer connectable with a printer, the computer including a processor configured to function as:
an application unit based on an application program;
an interface unit based on an interface program; and
a printer driver unit based on a printer driver program,
wherein the interface unit is configured to perform:
inputting a print start command to the printer driver unit in response to a printing-related command received from the application unit in which operation to start printing is performed:
inputting a setting change command and a first print settings to the printer driver unit in accordance with the printing-related command received from the application unit after inputting the print start command;
issuing a drawing command after inputting the setting change command and the first print settings, the drawing command being issued in accordance with a second print settings when the first print settings is converted into the second print settings by the printer driver unit, the drawing command being issued in accordance with the first print settings when the first print settings is not converted;
inputting the drawing command to the printer driver unit;
transmitting a page end command to the printer driver unit in response to the printing-related command received from the application unit after inputting the drawing command; and
transmitting a print end command to the printer driver unit in response to the printing-related command received from the application unit after inputting the page end command;

the printing method, after the printer driver unit receives the print start command from the interface unit, comprising:
determining whether or not a print cancel condition for canceling print according to the print start command is met;
storing print cancel information in response to determination that the print cancel condition is met without reporting to the application unit that the print cancel condition is met:
converting the first print settings inputted from the interface unit into the second print settings if the print cancel information is stored when the setting change command is received, a first time period required for the interface unit to issue the drawing command corresponding to the first print settings being longer than a second time period required for the interface unit to issue the drawing command corresponding to the second print settings;

the printing method, after the first print settings is converted into the second print settings, comprising:
skipping a drawing process according to the drawing command if the print cancel information is stored when the drawing command is received from the interface unit;
skipping an output process of a drawing result to the printer if the print cancel information is stored when the page end command is received from the interface unit; and
displaying a cancellation message if the print cancel information is stored when the print end command is received from the interface unit.

* * * * *